US007734516B2

(12) United States Patent
Barnum et al.

(10) Patent No.: US 7,734,516 B2

(45) Date of Patent: *Jun. 8, 2010

(54) METHOD FOR PROVIDING REVISIONAL DELTA BILLING AND RE-BILLING IN A DYNAMIC PROJECT ENVIRONMENT

(75) Inventors: Deborah K. Barnum, Vestal, NY (US); Scott D. Hicks, Underhill Center, VT (US); James A. Martin, Jr., Endicott, NY (US)

(73) Assignee: International Business Machines Corporation, Armonk, NY (US)

(*) Notice: Subject to any disclaimer, the term of this patent is extended or adjusted under 35 U.S.C. 154(b) by 626 days.

This patent is subject to a terminal disclaimer.

(21) Appl. No.: 11/236,267

(22) Filed: Sep. 27, 2005

(65) Prior Publication Data

US 2007/0083446 A1 Apr. 12, 2007

(51) Int. Cl.
*G07F 19/00* (2006.01)
*H04M 15/00* (2006.01)

(52) U.S. Cl. .......... 705/34

(58) Field of Classification Search .......... 705/34
See application file for complete search history.

(56) References Cited

U.S. PATENT DOCUMENTS 6,072,493 A * 6/2000 Driskell et al. .......... 715/854
6,253,206 B1 * 6/2001 Burton et al. .......... 707/103 R
2002/0069167 A1 * 6/2002 Conlow .......... 705/40
2003/0097296 A1 * 5/2003 Putt .......... 705/11
2003/0187760 A1 * 10/2003 Matsumoto et al. .......... 705/34
2005/0125522 A1 * 6/2005 DelGaudio et al. .......... 709/223
2005/0262105 A1 * 11/2005 DelGaudio et al. .......... 707/10

OTHER PUBLICATIONS

WikiFlat_file_database, downloaded from Wikipedia (http://en.wikipedia.org on Feb. 6, 2009). 4 pages.*

* cited by examiner

*Primary Examiner*—F. Ryan Zeender
*Assistant Examiner*—Paul Danneman
(74) *Attorney, Agent, or Firm*—Anne Linne; Hoffman Warnick LLC

(57) ABSTRACT

The present invention provides a method, system, and computer program product for providing revisional delta billing and re-billing in a dynamic project environment. A method in accordance with an embodiment of the present invention includes capturing data points associated with a first billing at a first point in time, capturing data points associated with a second billing at a second point in time, comparing the data points captured at the first and second points in time; and generating a revisional delta bill based on differences between the data points captured at the first and second points in time.

6 Claims, 8 Drawing Sheets

26

30

50

METHOD FOR PROVIDING REVISIONAL DELTA BILLING AND RE-BILLING IN A DYNAMIC PROJECT ENVIRONMENT

BACKGROUND OF THE INVENTION

1. Field of the Invention

The present invention generally relates to computerized billing systems. More particularly, the present invention provides a method, system, and computer program product for providing revisional delta billing and re-billing in a dynamic project environment.

2. Related Art

Information Technology (IT) projects that provide services to individual employees often need to bill those employees' business units for materials or labor. The materials or labor can vary between employees, depending upon the individual employee's existing hardware or software configuration, environmental conditions, network connection, requirements for system modifications or system capabilities, etc. For example, during a migration from a token ring to an Ethernet network:

(A) There may be different types of Ethernet adapters required for different types of systems;

(B) Some employees may need patch cables;

(C) Some employees may need specialized connectors to plug a cable into a particular type of wall port; and (D) The time needed to migrate each system may vary depending upon the system's hardware and software configuration.

Because of the highly dynamic nature of such a project, where metrics are constantly in flux, it often becomes difficult to manage the revisional delta billing and re-billing processes, particularly where timely revisional delta billing and timely re-billing is required. This is especially true for large projects involving thousands of employees and thousands of systems.

SUMMARY OF THE INVENTION

In general, the present invention provides a method, system, and computer program product for providing revisional delta billing and re-billing in a dynamic project environment.

In accordance with an embodiment of the present invention, a "snapshot" of data points is captured at the time of billing for use in generating revisional delta bills. In particular, a revisional delta bill is generated by comparing snapshots of data points taken at two different points of time, analyzing the differences between the snapshots, and determining the amount to be billed/credited based on the differences. Each snapshot of data points serves as a reference (i.e., a point of comparison) going forward for use in generating revisional delta bills. In accordance with another embodiment of the present invention, a mechanism is provided for generating a revisional bill in response to an ad hoc request.

A first aspect of the present invention is directed to a method for revisional delta billing, comprising: capturing data points associated with a first billing at a first point in time; capturing data points associated with a second billing at a second point in time; comparing the data points captured at the first and second points in time; and generating a revisional delta bill based on differences between the data points captured at the first and second points in time.

A second aspect of the present invention is directed to a system for revisional delta billing, comprising: a system for capturing data points associated with a first billing at a first point in time; a system for capturing data points associated with a second billing at a second point in time; a system for comparing the data points captured at the first and second points in time; and a system for generating a revisional delta bill based on differences between the data points captured at the first and second points in time.

A third aspect of the present invention is directed to a program product stored on a computer readable medium for revisional delta billing, the computer readable medium comprising program code for performing the following steps: capturing data points associated with a first billing at a first point in time; capturing data points associated with a second billing at a second point in time; comparing the data points captured at the first and second points in time; and generating a revisional delta bill based on differences between the data points captured at the first and second points in time.

A fourth aspect of the present invention is directed to a method for deploying an application for revisional delta billing, comprising: providing a computer infrastructure being operable to: capture data points associated with a first billing at a first point in time, capture data points associated with a second billing at a second point in time, compare the data points captured at the first and second points in time; and generate a revisional delta bill based on differences between the data points captured at the first and second points in time.

A fifth aspect of the present invention provides computer software embodied in a propagated signal for revisional delta billing, the computer software comprising instructions to cause a computer system to perform the following functions: capture data points associated with a first billing at a first point in time, capture data points associated with a second billing at a second point in time, compare the data points captured at the first and second points in time; and generate a revisional delta bill based on differences between the data points captured at the first and second points in time.

BRIEF DESCRIPTION OF THE DRAWINGS

These and other features of this invention will be more readily understood from the following detailed description of the various aspects of the invention taken in conjunction with the accompanying drawings in which.

Figure 1:
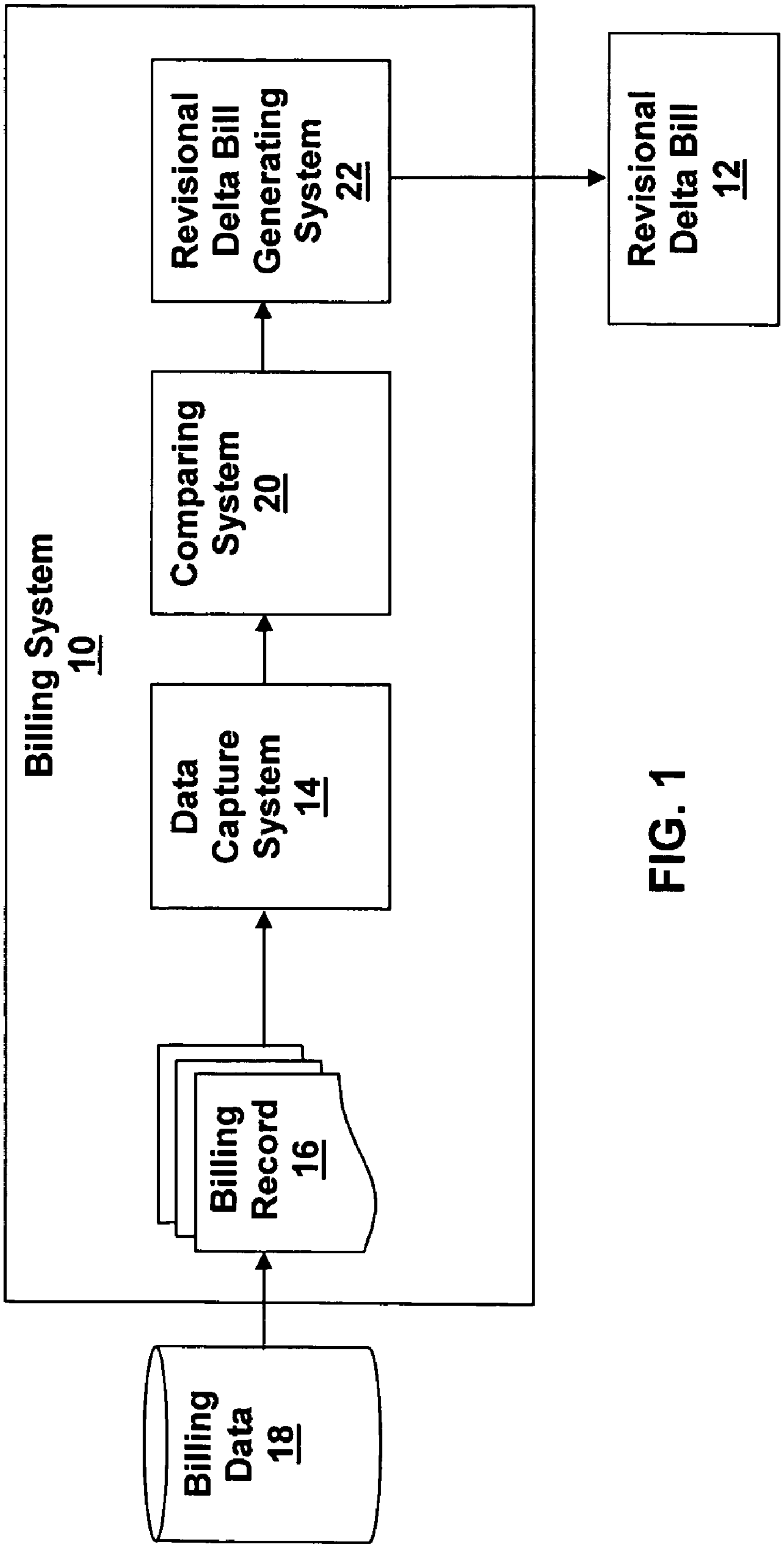
FIG. 1 depicts an illustrative billing system for providing revisional delta billing in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention is directed to a method, system, and computer program product for providing revisional delta billing and re-billing in a dynamic project environment.

An illustrative billing system 10 for providing revisional delta bills 12 in accordance with an embodiment of the present invention is illustrated in FIG. 1. The billing system 10 includes a data capture system 14 for capturing data points in the form of billing records 16 from billing data 18 at the time of billing (original and revisional billing), a comparing system 20 for comparing and analyzing the billing records 16 generated at different billing times (i.e., at different points of comparison) and for determining the amount to be billed/credited based on the differences between the billing records 16, and a revisional delta bill generating system 22 for outputting revisional delta bills 12.

Figure 2:
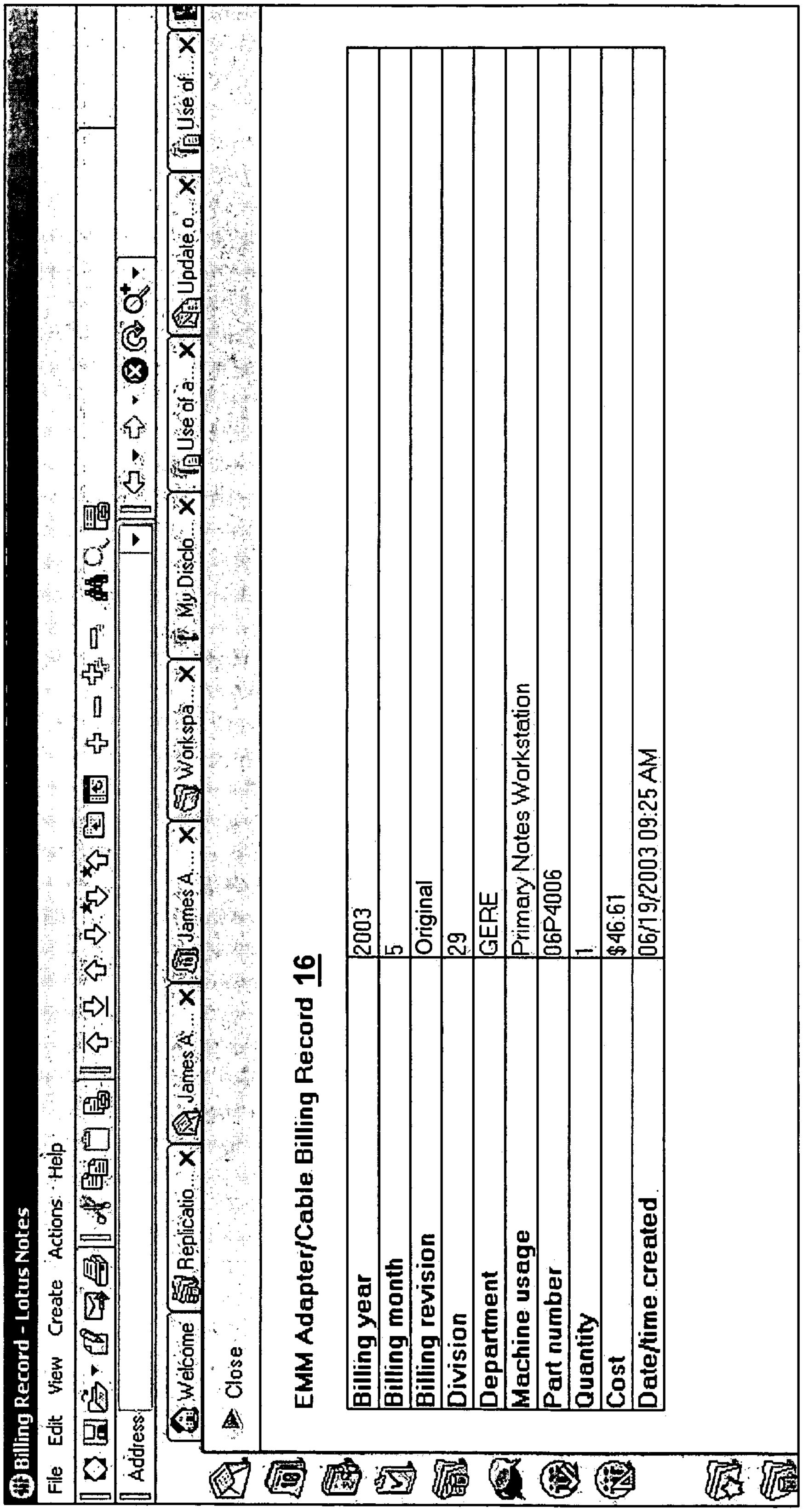
FIGS. 2-4 depict illustrative billing records (data points) taken at different points in time.

FIG. 2 depicts a screenshot 26 of an illustrative "EMM Adapter/Cable" billing record (data point) 16 taken at a point in time $T_1$ at which an original bill was generated. In this example, the "EMM Adapter/Cable" billing record 16 includes the following data values:

| | |
|---|---|
| Billing Year: | 2003 |
| Billing Month: | 5 |
| Billing Revision: | Original |
| Division: | 29 |
| Department: | GERE |
| Machine Usage: | Primary Notes Workstation |
| Part Number: | 06P4006 |
| Quantity: | 1 |
| Cost: | $46.61 |
| Date/time Created: | Jun. 19, 2003 09:25 AM |

Thus, the "EMM Adapter/Cable" billing record 16 created on Jun. 19, 2003 at 9:25 AM and associated with the original version of a bill shows that department "GERE" of division "29," for "Primary Notes Workstations," was provided with one adapter having part number "06P4006" at a cost of $46.61/adapter.

Figure 3:
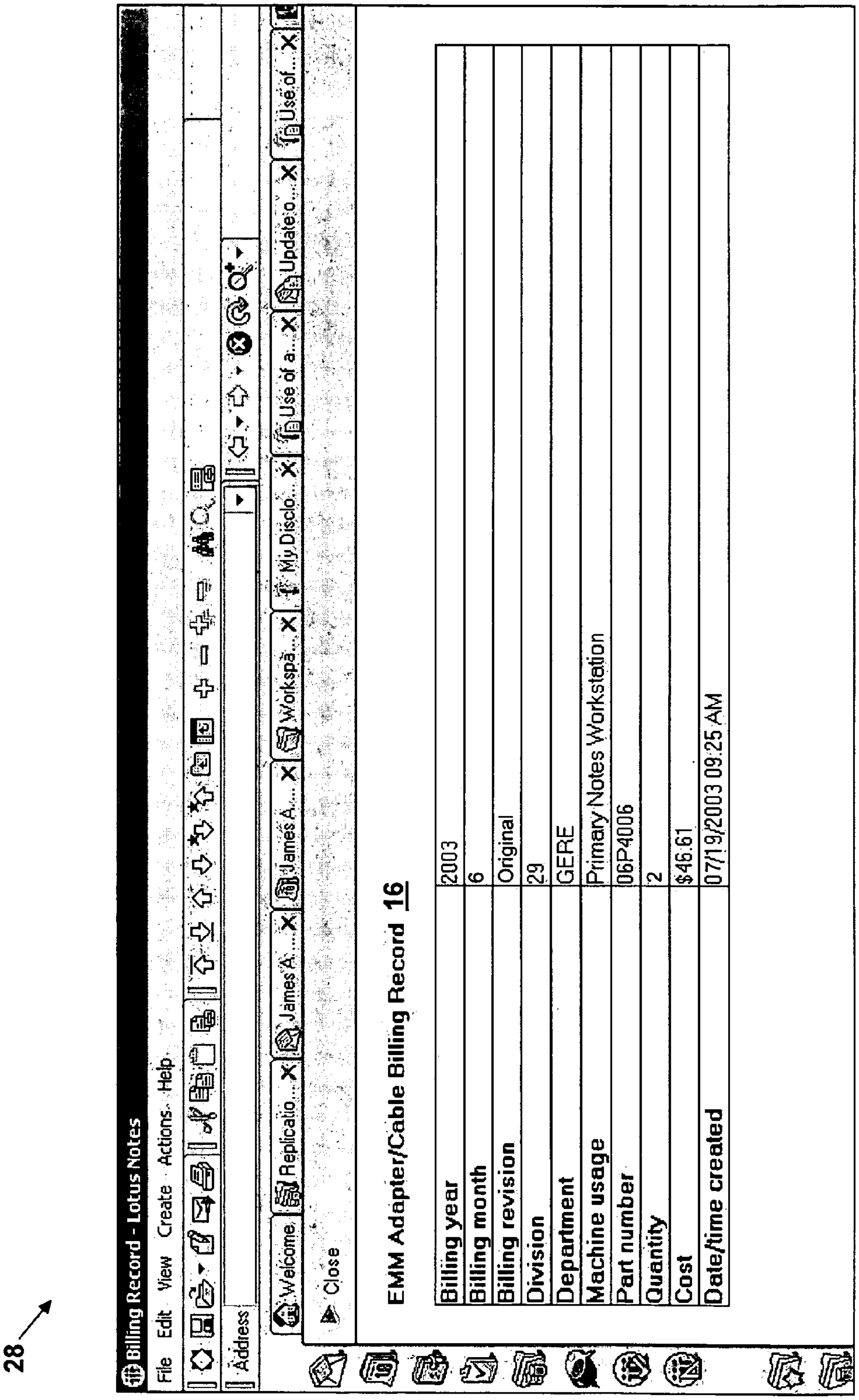

FIG. 3 depicts a screenshot 28 of an "EMM Adapter/Cable" billing record 16 taken at a point in time $T_2$ ($T_2$>$T_1$) at which a first revision of the bill was generated. As shown, the "EMM Adapter/Cable" billing record 16 now includes the following values:

| | |
|---|---|
| Billing Year: | 2003 |
| Billing Month: | 6 |
| Billing Revision: | 1 |
| Division: | 29 |
| Department: | GERE |
| Machine Usage: | Primary Notes Workstation |
| Part Number: | 06P4006 |
| Quantity: | 2 |
| Cost: | $46.61 |
| Date/time Created: | Jul. 19, 2003 09:25 AM |

Thus, the "EMM Adapter/Cable" billing record 16 created on Jul. 19, 2003 at 9:25 AM and associated with the first revision of the bill shows that department "GERE" of division "29," for "Primary Notes Workstations," has received a total of two adapters having part number "06P4006" at a cost of $46.61/adapter.

In order to generate a revisional delta bill 12 (FIG. 1) for the first revision of the bill, the comparing system 20 of the present invention analyzes and compares the billing records 16 created at time $T_2$ with the corresponding billing records 16 created at $T_1$. In this example, it is assumed for simplicity that only a single billing record 16 (i.e., "EMM Adapter/Cable" billing record 16) is associated with the bill. In general, however, a plurality of different billing records 16 may be associated with a given bill.

The comparison of the "EMM Adapter/Cable" billing record 16 created at time $T_2$ with the corresponding "EMM Adapter/Cable" billing record 16 created at $T_1$, reveals that department "GERE" of division "29, for "Primary Notes Workstations," received an additional adapter having part number "06P4006" during the time interval from $T_1$, to $T_2$. As such, department "GERE" of division "29" should be billed an additional $46.61 to cover the cost of the additional adapter. The revisional delta bill generating system 22 generates a revisional delta bill 12 that captures the additional amount of $46.61 to be billed to department "GERE" of division "29" and provides information regarding why the additional amount has been billed (e.g., an extra adapter "06P4006" was received).

Figure 4:
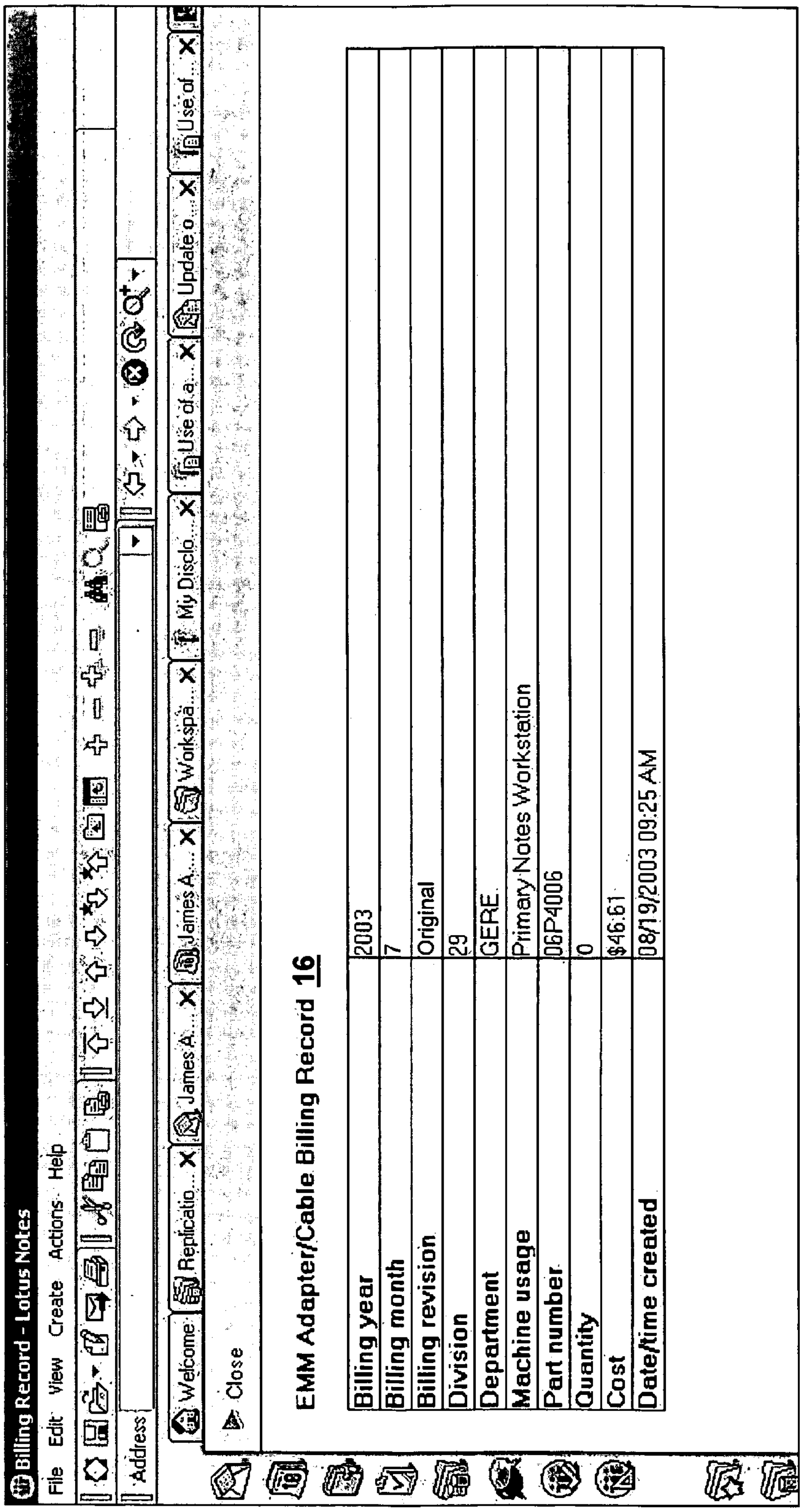

FIG. 4 depicts a screenshot 30 of an "EMM Adapter/Cable" billing record 16 taken at a point in time $T_3$ ($T_3$>$T_2$>$T_1$) at which a second revision of the bill was generated. As shown, the "EMM Adapter/Cable" billing record 16 now includes the following values:

| | |
|---|---|
| Billing Year: | 2003 |
| Billing Month: | 7 |
| Billing Revision: | 1 |
| Division: | 29 |
| Department: | GERE |
| Machine Usage: | Primary Notes Workstation |
| Part Number: | 06P4006 |
| Quantity: | 0 |
| Cost: | $46.61 |
| Date/time Created: | Aug. 19, 2003 09:25 AM |

Thus, the "EMM Adapter/Cable" billing record 16 created on Aug. 19, 2003 at 9:25 AM and associated with the second revision of the bill shows that department "GERE" of division "29," for "Primary Notes Workstations," required zero adapters having part number "06P4006" at a cost of $46.61/adapter. This is indicated by the "0" value in the "Quantity" field of the "EMM Adapter/Cable" billing record 16 shown in FIG. 4. This could be the case, for example, if different adapters were actually used in place of the adapters having part number "06P4006," the two previously received adapters having part number "06P4006" were returned for some reason, etc.

In order to generate a revisional delta bill 12 (FIG. 1) for the second revision of the bill, the comparing system 20 of the present invention analyzes and compares the "EMM Adapter/Cable" billing record 16 created at time $T_3$ with the corresponding "EMM Adapter/Cable" billing record 16 created at $T_2$. This comparison reveals that department "GERE" of division "29" did not, in actuality, use any of the previously received adapters having part number "06P4006." As such, department "GERE" of division "29" should be credited an amount of $93.22 corresponding to the amount previously billed to cover the cost of the two adapters having part number "06P4006." The revisional delta bill generating system 22 generates a revisional delta bill 12 that credits department "GERE" of division "29" the amount of $93.22 and provides information regarding why the credit was given.

Figure 5:
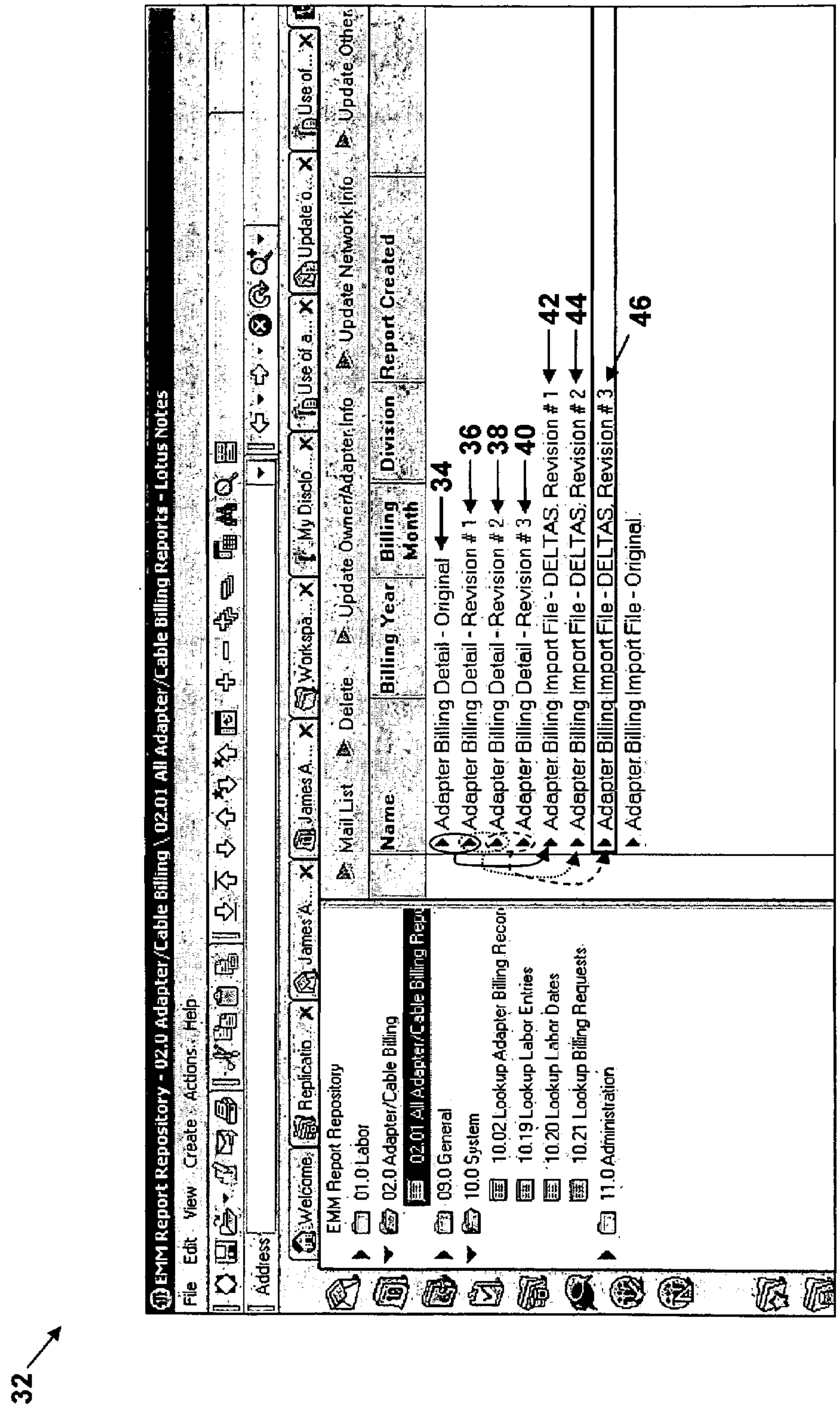
FIG. 5 depicts an illustrative screenshot of a plurality of different reports provided in accordance with an embodiment of the present invention.

An illustrative screenshot 32 illustrating a plurality of different Adapter/Cable Billing Reports provided in accordance with an embodiment of the present invention is depicted in FIG. 5. As shown, the Adapter/Cable Billing Reports include an "Adapter Billing Detail—Original" report 34 that provides detailed information regarding an original bill. Also provided are a plurality of reports detailing revisions to the original bill, including an "Adapter Billing Detail—Revision #1" report 36 that provides detailed information regarding a first revision of the bill at a time $T_1$, an "Adapter Billing Detail—Revision #2" report 38 that provides detailed information regarding a second revision of the bill at a time $T_2$ ($T_2>T_1$) and an "Adapter Billing Detail—Revision #3" report 40 that provides detailed information regarding a third revision of the bill at a time $T_3$ ($T_3>T_2>T_1$) The revised bills can be generated automatically, for example, every three months, or can be generated in an ad hoc manner as needed. The information in each of the reports 34, 36, 38, 40 can be provided using a spreadsheet or in any other suitable manner.

The Adapter/Cable Billing Reports shown in FIG. 5 also include a plurality of import files that are used in the generation of revisional delta bills. In particular, there is provided a "DELTAS, Revision #1" adapter billing import file 42, a "DELTAS, Revision #2" adapter billing import file 44, and a "DELTAS, Revision #3" adapter billing import file 46. The "DELTAS, Revision #1" adapter billing import file 42 includes delta information derived by comparing information in the "Adapter Billing Detail—Revision #1" report 36 to corresponding information in the "Adapter Billing Detail—Original" report 34. Similarly, the "DELTAS, Revision #2" adapter billing import file 44 includes delta information derived by comparing information in the "Adapter Billing Detail—Revision #2" report 38 to corresponding information in the "Adapter Billing Detail—Revision #1" report 36, while the "DELTAS, Revision #3" adapter billing import file 46 includes delta information derived by comparing information in the "Adapter Billing Detail—Revision #3" report 40 to corresponding information in the "Adapter Billing Detail—Revision #2" report 38. The adapter billing import files 42, 44, and 46 (and corresponding revisional delta bills) can be generated automatically or in response to an ad hoc request.

Figure 6:
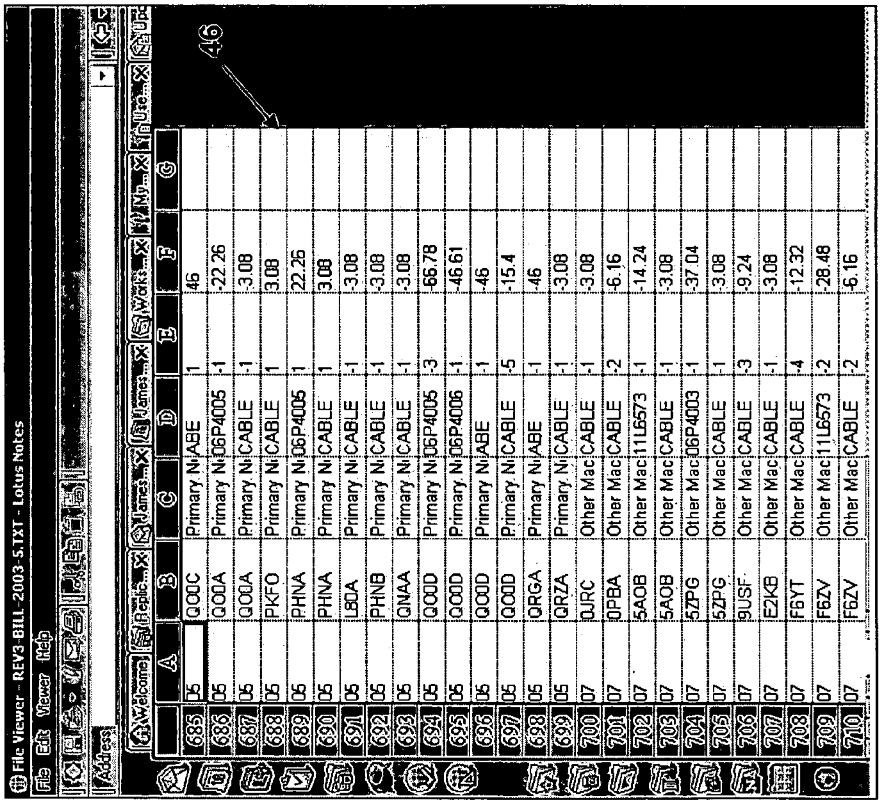
FIG. 6 depicts an illustrative screenshot of an adapter billing import file in accordance with an embodiment of the present invention.

An illustrative screenshot 50 of the "DELTAS, Revision #3" adapter billing import file 46 highlighted in FIG. 5 is illustrated in FIG. 6. In this example, the "DELTAS, Revision #3" adapter billing import file 46 comprises a comma-separated value file in spreadsheet form. This type of file can be generated by the comparing system 20 (FIG. 1) and then imported by the revisional delta bill generating system 22 to generate a revisional delta bill 12. The columns in the "DELTAS, Revision #3" adapter billing import file 46 provide the following information:

| | |
|---|---|
| Column A: | Division |
| Column B: | Department |
| Column C: | Machine Usage |
| Column D: | Part Number |
| Column E: | Delta - Quantity |
| Column F | Delta - $ |

For example, row 695 in the "DELTAS, Revision #3" adapter billing import file 46 provides the following information: Department "QO0D" of division "05," for "Primary Notes Workstations," used one less adapter with part number "06P4006" than anticipated and should be credited $46.61.

Figure 7:
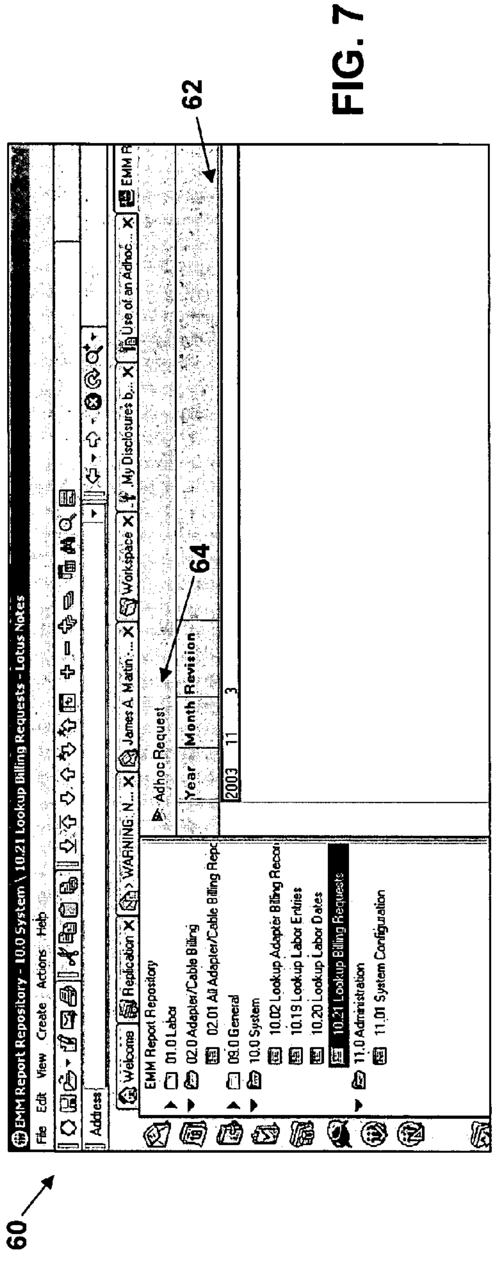
FIG. 7 depicts an illustrative screenshot of a mechanism for submitting an ad hoc request for a revisional bill in accordance with an embodiment of the present invention.
Figure 8:
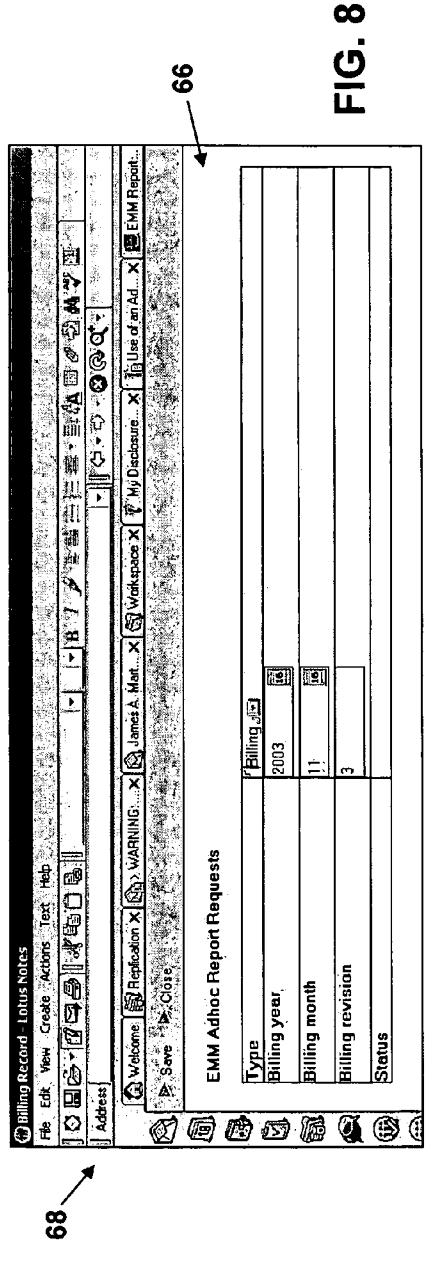
FIG. 8 depicts an illustrative screenshot of a data entry dialog for entering an ad hoc request for a revisional bill in accordance with an embodiment of the present invention.

As detailed above, a revisional bill (i.e., a "re-bill") can be generated in response to an ad hoc request. A mechanism for submitting such an ad hoc request is illustrated in the screenshot 60 depicted in FIG. 7. In particular, a request dialog 62 is provided that includes a button 64 for submitting an ad hoc request for a revisional bill. As shown in FIG. 7, a user has requested a revisional bill based upon the third revision of a bill that was generated in November 2003. This request was generated by actuating the ad hoc request button 64 and filling out the data entry dialog 66 such as that displayed in the screenshot 68 in FIG. 8. In response to this request, an agent wakes up and generates, in this case, a fourth revision of the bill based on the data points of the third revision of the bill.

The present invention has been described above with reference to an IT migration of devices within a company and internal company billing associated with the migration. It should be realized, however, that the concepts of the present invention can be used in conjunction with many other types of billable services, activities, organizations, etc., without departing from the intended scope of the present invention.

Figure 9:
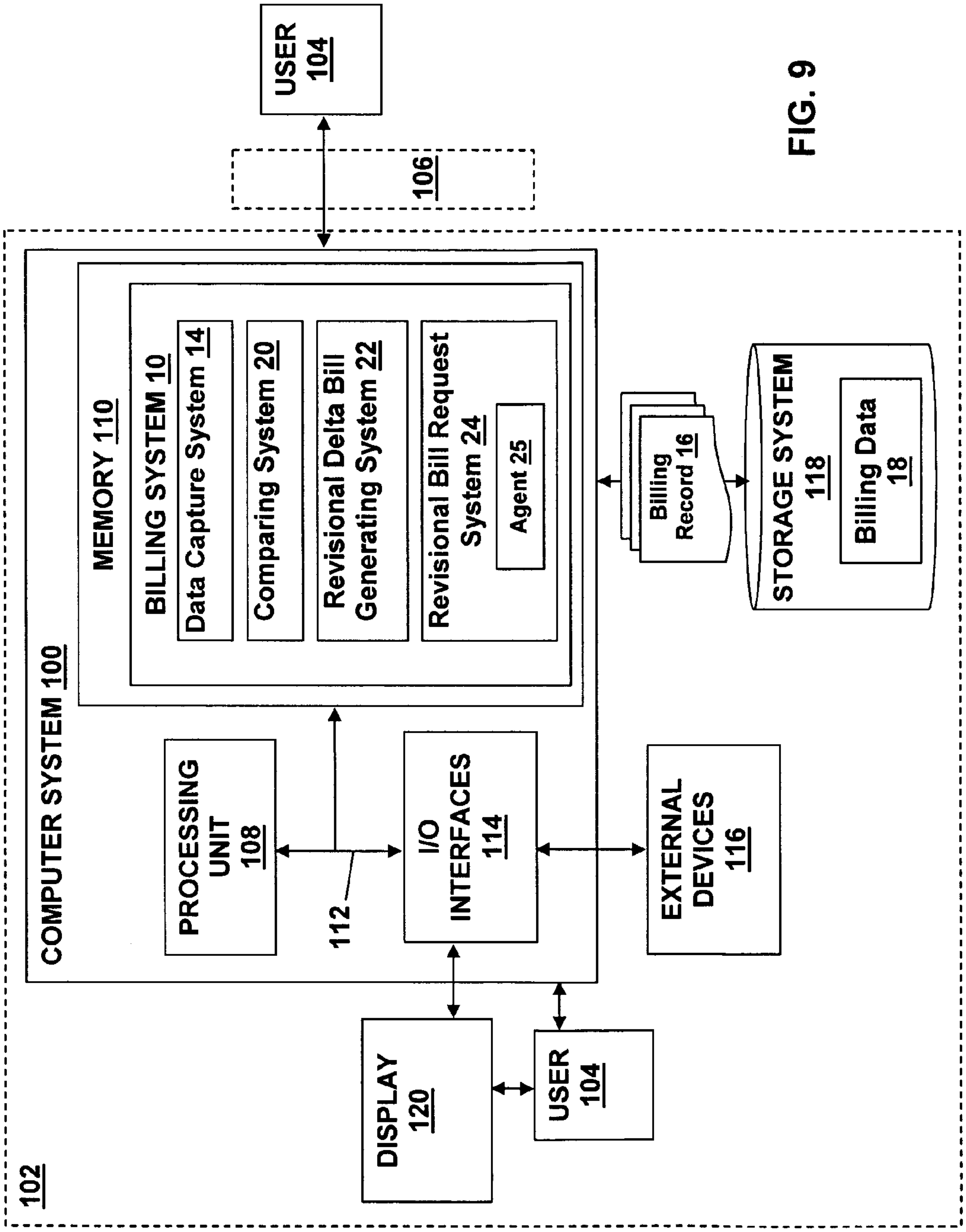
FIG. 9 illustrates a system for implementing an embodiment of the present invention.

A computer system 100 for implementing a method for providing revisional delta billing and re-billing in a dynamic project environment in accordance with an embodiment of the present invention is depicted in FIG. 9. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for preventing unwanted application behavior in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as billing system 10, that is stored in memory 110 and/or storage system(s) 118. While executing computer program code, processing unit 108 can read and/or write data, to/from memory 110, storage system (s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 9 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. Such information can include, for example, original bills, revisional bills, revisional delta bills, billing records, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a billing system 10 for providing revisional delta billing and re-billing in a dynamic project environment in accordance with an embodiment of the present invention. The billing system 10 includes a data capture system 14 for capturing data points in the form of billing records 16 from billing data 18 (e.g., stored in storage system 118) at the time of billing (original and revisional billing), a comparing system 20 for comparing and analyzing the billing records 16 generated at different billing times (i.e., at different points of comparison) and for determining the amount to be billed/credited based on the differences between the billing records 16, and a revisional delta bill generating system 22 for outputting revisional delta bills. The billing system 10 further includes a revisional bill request system 24 that allows user 104 submit an ad hoc request for a revisional bill. In response to the request, an agent 25 generates the requested revisional bill.

The present invention can be offered as a business method on a subscription or fee basis. For example, one or more components of the present invention can be created, maintained, supported, and/or deployed by a service provider that offers the functions described herein for customers. That is, a service provider can be used to provide a service for providing revisional delta billing and re-billing in a dynamic project environment, as described above.

It should also be understood that the present invention can be realized in hardware, software, a propagated signal, or any combination thereof Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims

What is claimed is:

1. A computer-implemented method for revisional delta billing, comprising:

capturing data points associated with a first billing at a first point in time using a capture system stored in a memory;

capturing data points associated with a second billing at a second point in time using the capture system stored in the memory;

comparing the data points captured at the first and second points in time, wherein the comparing includes generating a first adapter billing import file comprising a comma-separated value file;

generating a first revisional delta bill based on differences between the data points captured at the first and second points in time, wherein the generating includes importing the first adapter billing import file to generate the first revisional delta bill;

capturing data points associated with a third billing at a third point in time using the capture system stored in the memory;

comparing the data points captured at the second and third points in time, wherein the comparing includes generating a second adapter billing import file comprising a comma-separated value file;

generating a second revisional delta bill based on differences between the data points captured at the second and third points in time, wherein the generating includes importing the second adapter billing import file to generate the second revisional delta bill; and providing the second revisional delta bill for presentation to a user, wherein the first billing is an original billing and wherein the second and third billings are revisional billings, wherein the data points comprise billing records, wherein the billing records include a quantity and cost of at least one item, and wherein the revisional delta bill is based on a difference in the quantity of the at least one item and a total cost of each item, and wherein each item is associated with an Information Technology (IT) migration within a company.

2. The method of claim 1, wherein each billing record further includes information comprising:

a billing month and year;

a billing revision;

a responsible party;

a usage of the item an identification of an item; and a date and time of creation of the billing record.

3. A computer-implemented system for revisional delta billing, comprising:

at least one processing unit; and a memory operably associated with the at least one processing unit;

a billing system stored in the memory and executable by the at least one processing unit, the billing system comprising:

a data capture system for capturing data points associated with a first billing at a first point in time, data points associated with a second billing at a second point in time, and data points associated with a third billing at a third point in time, wherein the first billing is an original billing and wherein the second and third billings are revisional billings, wherein the data points comprise billing records, wherein the billing records include a quantity and cost of at least one item, and wherein each item is associated with an Information Technology (IT) migration within a company;

a comparing system for comparing the data points captured at the first and second points in time, wherein the comparing includes generating a first adapter billing import file comprising a comma-separated value file;

a revisional delta bill generating system for generating a first revisional delta bill based on differences between the data points captured at the first and second points in time, wherein the generating includes importing the first adapter billing import file to generate the first revisional delta bill, wherein the revisional delta bill is based on a difference in the quantity of the at least one item and a total cost of each item;

wherein the comparing system further compares the data points captured at the second and third points in time, wherein the comparing system further generates a second adapter billing import file comprising a comma-separated value file wherein the revisional delta bill generating system further generates a second revisional delta bill based on differences between the data points captured at the second and third points in time, wherein the generating includes importing the second adapter billing import file to generate the second revisional delta bill; and a presentation system for providing the second revisional delta bill for presentation to a user.

4. The computer-implemented system of claim 3, wherein each billing record further includes information comprising:

a billing month and year;

a billing revision;

a responsible party;

a usage of the item an identification of an item; and a date and time of creation of the billing record.

5. A computer-readable storage medium storing computer instructions, which when executed, enable a computer infrastructure to perform a method for revisional delta billing, the method comprising:

capturing data points associated with a first billing at a first point in time;

capturing data points associated with a second billing at a second point in time;

comparing the data points captured at the first and second points in time, wherein the comparing includes generating a first adapter billing import file comprising a comma-separated value file generating a first revisional delta bill based on differences between the data points captured at the first and second points in time, wherein the generating includes importing the first adapter billing import file to generate the first revisional delta bill; capturing data points associated with a third billing at a third point in time;

comparing the data points captured at the second and third points in time, wherein the comparing includes generating a second adapter billing import file comprising a comma-separated value file;

generating a second revisional delta bill based on differences between the data points captured at the second and third points in time, wherein the generating includes importing the second adapter billing import file to generate the second revisional delta bill; and providing the second revisional delta bill for presentation to a user, wherein the first billing is an original billing and wherein the second and third billings are revisional billings, wherein the data points comprise billing records, wherein the billing records include a quantity and cost of at least one item, and wherein the revisional delta bill is based on a difference in the quantity of the at least one item and a total cost of each item, and wherein each item is associated with an Information Technology (IT) migration within a company.

6. The computer readable medium of claim 5, wherein each billing record further includes information comprising:

a billing month and year;

a billing revision;

a responsible party;

a usage of the item an identification of an item; and a date and time of creation of the billing record.

* * * * *